Nov. 20, 1951  J. H. TREVITT  2,576,084
SPEED CONTROL SYSTEM FOR CAPACITOR MOTORS
Filed April 30, 1949
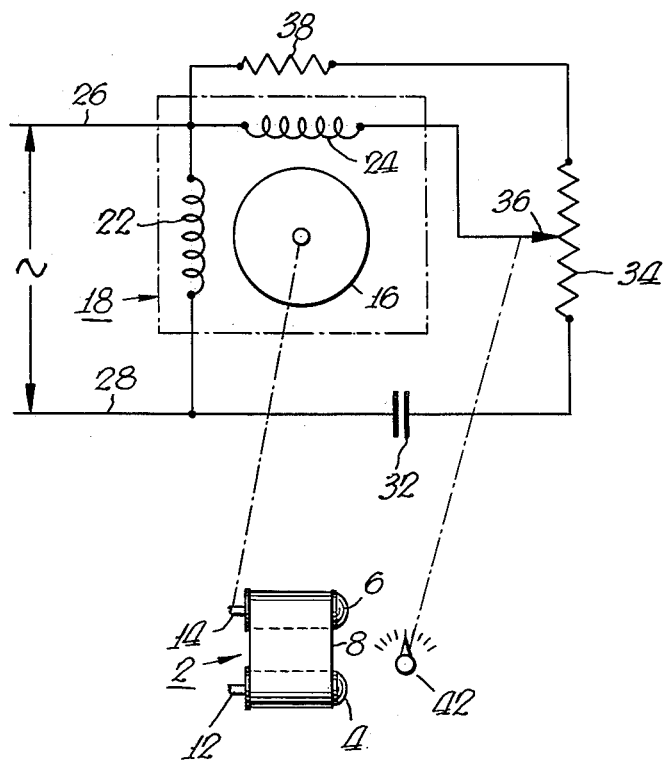
INVENTOR
John H. Trevitt
BY
Curtis, Morris + Safford
ATTORNEYS

UNITED STATES PATENT OFFICE 2,576,084

SPEED CONTROL SYSTEM FOR CAPACITOR MOTORS

John H. Trevitt, Bridgeport, Conn., assignor to Dictaphone Corporation, Bridgeport, Conn.

Application April 30, 1949, Serial No. 90,750

6 Claims. (Cl. 318—220)

This invention relates to dictating machines and more particularly to a system for controlling the speed of reproduction of such machines.

In dictating machines, the speed of the machine used for recording the dictation is ordinarily maintained constant, whereas the speed of the transcribing machine must be adjustable so that the rate of reproduction can be readily varied in accordance with the wishes of the operator. Such machines have commonly been designed for use on either alternating or direct current, utilizing a universal motor the speed of which is controlled by means of a fly-ball governor. However, due to such factors as the increasing availability of alternating current, the present trend is toward machines designed for operation on alternating current only, with the provision of an external converter when operation from direct current is desired. It is desirable to use relatively inexpensive two-phase induction motors in such machines, but a suitable speed control system must be provided for the transcribing machines.

Various circuits have been known or proposed for varying the speed of such induction motors. Many of these systems are satisfactory for particular applications, but completely unsuitable for use in dictation transcribing machines. For example, bulky speed control systems are unsuitable; and cost and production limitations precluded the use of many other known systems which are expensive and complex. Furthermore, some arrangements do not provide sufficient starting torque when the speed control is adjusted to slow-speed position, and others fail to permit a sufficiently wide range of variation in speed. Moreover, to be economically feasible, the speed control system must be capable of using commercially available electrical components; for example the values of capacitors, such as are used for obtaining phase shift in one motor winding relative to another, ordinarily are supplied commercially with a tolerance of ten or even twenty percent. In known systems, such a variation in capacitance causes an excessive variation in the range of motor speed from that for which the system was designed, thus necessitating expensive and time-consuming testing and sorting of components to produce a standard product. For these and other reason, known systems which appeared likely to offer a solution for the speed control problem in alternating-current-operated transcribing machines have so far proved unsatisfactory.

The speed control system described below utilizes a conventional two-phase induction motor in which one field winding is connected directly across the alternating current mains, and a second field winding is connected to the mains through a series phase-shifting condenser. However, in accordance with the present invention, a resistance is connected in series with the second field winding and another resistance is connected in parallel with this winding in a circuit arrangement including a potentiometer for simultaneously varying the values of both of these resistances in opposite directions, thereby varying both the magnitude and phase angle of the current through the second winding, as well as the current which is shunted around this second winding.

This arrangement has been found most satisfactory for providing accurate control of the speed of reproduction in transcribing machines. The starting torque, even on the lowest speed setting, is adequate to drive a transcribing machine and a relatively wide range of speed variation is obtained. In addition it has the advantageous characteristic that the change in speed for a given change in potentiometer setting is substantially uniform throughout the range, in contrast to some earlier arrangements in which the speed changed rapidly at one part of the adjustment range, but only slightly over other portions of the range. Moreover, in accordance with the present invention, the designed speed range of the variable speed motor system is substantially unaffected by differences in the values of the phase-shifting capacitors within commercial tolerance limits.

Other aspects, objects, and advantages of the present invention will be apparent from a consideration of the following description taken in conjunction with the accompanying drawing which shows, diagrammatically, a motor connected to an electrical circuit of a speed control arrangement embodying the invention as used to drive a dictating machine.

As shown in the drawing a transcribing machine, generally indicated diagrammatically at 2, includes two spaced parallel mandrels 4 and 6 which are arranged to support and drive a flexible belt record 8 from which dictation is to be reproduced, for example, in the manner shown in U. S. Patent 2,371,116 to Yerkovitch. Mandrel 4 is an idler and is supported for free rotation on a shaft 12; mandrel 6 is supported on a shaft 14 which is arranged to be driven by a rotor 16 of a two-phase induction motor, generally indicated at 18.

This motor 18 is provided with two field windings 22 and 24 which are adapted for energization with currents that are 90 degrees out-of-phase. Field winding 22 is connected directly across alternating current supply conductors 26 and 28, and the current in this field winding lags the applied voltage because of the inductive reactance of the winding. One end of the other field winding 24 is connected directly to alternating current line 26, and the other end of this winding is connected to line 28 through a series condenser 32, so that the current through the latter winding leads the applied voltage because of the capacitive reactance of the condenser 32.

In order to provide for control of the speed of motor 18, a potentiometer 34, having an adjustable contact 36, and a fixed resistor 38 are connected in the circuit so as to permit simultaneous and opposite variations in the resistances which are in series and in parallel with the winding 24. The condenser 32 is connected to line 28 and in series with potentiometer 34 and fixed resistance 38 to the line 26. One end of field winding 24 is connected to the adjustable contact 36 of potentiometer 34 and its other end is connected to supply line 26. A suitable control knob 42 is provided for adjusting the position of contact 36.

To increase the speed of the motor 18 the adjustable contact 36 of potentiometer 34 is moved toward the condenser 32. This decreases the resistance in series with winding 24 and increases the value of the resistance in parallel with this winding. Adjustment of potentiometer contact 36 in the opposite direction reduces the speed of the motor. It is apparent that both the phase and magnitude of the current through winding 24 will depend upon the setting of the potentiometer 34. When the potentiometer 34 is adjusted for maximum motor speed, only the condenser 32 is in series with the field winding 24, and the total series resistance of the potentiometer 34 and resistor 38 are connected in parallel with winding 22. When the potentiometer is adjusted for minimum motor speed, the condenser 32 and the total resistance of potentiometer 34 are connected in series with winding 24, and only the resistance 38 is connected in parallel with the winding 24.

With the speed control arrangement of the present invention it has been found that all of the control components including the capacitor 32 can be of commercially obtainable types, and that ordinary tolerances in the values of the components will not cause appreciable change in the range of speed control for which the system is designed. In one satisfactory system of this type, using a 110-volt, 60-cycle, two-phase induction motor, the condenser 32 had a capacity of two microfarads, the potentiometer 34 had a maximum resistance of 1300 ohms, and resistor 38 was 950 ohms. With this arrangement, a speed variation of 920 to 1590 R. P. M. was obtained, which is more than adequate for normal transcribing purposes. A variation of ten percent in the capacitance value of the condenser 32 caused less than a one percent change in the designed speed control range.

If a particularly wide range of speed control is desired, in accordance with the present invention, it is necessary to use a two-phase alternating current induction motor having a high resistance rotor. For example, in order to obtain a suitable high resistance rotor to provide such a wide range of speed control, the squirrel cage rotor of such a motor may be made of brass or other such higher resistance metal instead of the copper usually used in such construction.

I claim:

1. In a dictating machine, a speed control arrangement comprising a two-phase induction motor having first and second field windings, a source of alternating current, said first winding being connected across said source of alternating current, a circuit comprising a condenser and a resistive voltage divider network connected in series across said source of alternating current, circuit means connecting said second winding in parallel with one portion and in series with another portion of said voltage divider network, and means for simultaneously varying the resistance of said network which is in parallel with said second winding and the resistance which is in series with said second winding.

2. In a dictating machine, a speed control arrangement comprising a source of alternating current, a two-phase induction motor having first and second field windings, said first winding being connected across said source of alternating current, and a circuit comprising a condenser and resistive means connected in series across said source of alternating current, said resistive means including a potentiometer having an adjustable contact, said second winding being connected to said contact and in parallel with at least a portion of said resistive means, whereby adjustment of said contact simultaneously varies in opposite directions the values of resistance in series and in parallel with said second winding.

3. In a dictating machine, a motor speed control arrangement comprising first and second conductors connectible to a source of alternating current, a two-phase electric induction motor having first and second separate field windings, said first winding being connected across said first and second conductors, a potentiometer having first and second fixed contacts and an adjustable contact, a series circuit comprising a condenser said first and second fixed contacts of said potentiometer and a fixed resistor, said series circuit being connected across said first and second conductors, one end of said second winding being connected to said adjustable contact and the opposite end connected to one end of said fixed resistance so as to connect said fixed resistance and a portion of said potentiometer depending upon the setting of said adjustable contact in parallel with said second winding, whereby adjustment of said potentiometer produces simultaneous changes in opposite directions in the values of resistance in series and in parallel with said second winding.

4. In a dictating machine, a motor speed control arrangement comprising a two-phase alternating-current electric motor, first and second inductive windings forming part of said motor, a source of alternating current, a first circuit connecting said first winding to said source, a second circuit coupling said second winding to said source, said second circuit including a resistance and capacitance in series with said second winding, an auxiliary circuit in parallel with said second winding, and adjustable means arranged to simultaneously vary in opposite directions the impedances of said second circuit and said auxiliary circuit.

5. In a dictating machine, a motor speed control arrangement comprising a two-phase induction motor having first and second separate field windings, a source of alternating current, said first winding being connected directly to said source of alternating current, a circuit comprising a condenser, a fixed resistor, and a potentiometer having two fixed contacts and an adjustable contact, said circuit being connected in series across said source of alternating current, said series circuit being connected to said fixed contacts of said potentiometer, and circuit means connecting said second winding to said adjustable contact of said potentiometer and in parallel with the series combination of said fixed resistor and a portion of said potentiometer dependent upon the setting of said adjustable contact, whereby adjustment of said contact simultaneously varies the magnitude and phase of current flowing through said second winding and the value of the resistance in parallel with said winding.

6. In a dictating machine, a motor speed control arrangement comprising a source of alternating current, a two-phase induction electric motor having first and second field windings, a first circuit connecting said first winding to said source, and a second circuit coupling said second winding to said source, said second circuit including first and second current paths, said first path including a capacitor, an adjustable portion of a potentiometer, and said second winding, said second path including said capacitor, said potentiometer and a fixed resistor, said potentiometer being arranged to control the currents in said first and second paths.

JOHN H. TREVITT.

REFERENCES CITED

The following references are of record in the file of this patent:

UNITED STATES PATENTS

| Number | Name | Date |
| --- | --- | --- |
| 2,095,281 | Owens | Oct. 12, 1937 |